United States Patent [19]

Mote

[11] 4,244,559
[45] Jan. 13, 1981

[54] BELT TIGHTENING TOOL

[75] Inventor: Ray R. Mote, Perkins, Okla.

[73] Assignee: Jack K. Vassar, Perkins, Okla.; a part interest

[21] Appl. No.: 66,844

[22] Filed: Aug. 15, 1979

[51] Int. Cl.³ .............................................. B66F 3/00
[52] U.S. Cl. .................................. 254/129; 81/90 B; 254/131
[58] Field of Search ............ 254/77, 83, 120, 129–131; 81/90 B, 177.8; 294/17

[56] References Cited

U.S. PATENT DOCUMENTS

| | | | |
|---|---|---|---|
| 1,582,572 | 4/1926 | Burkeybill | 81/90 B |
| 1,646,894 | 10/1927 | Basore | 254/131 |
| 2,629,584 | 2/1953 | Cannon | 254/120 |
| 2,910,271 | 10/1959 | Keehn | 254/131 |
| 3,063,315 | 11/1962 | Bernor et al. | 81/90 B |

FOREIGN PATENT DOCUMENTS 37 of 1908 United Kingdom .................... 81/90 B

*Primary Examiner*—Robert C. Watson
*Attorney, Agent, or Firm*—William R. Laney

[57] ABSTRACT

A tool for tightening an endless drive belt which includes a jaw having a concave gripping face, a lug-engaging toe projecting from said jaw at one end of said jaw at the terminus of said concave gripping face, an elongated lever arm having a bifurcated bracket at one end thereof receiving and engaging said jaw at a location spaced from said lug-engaging toe, and fasteners adjustably fastening the bracket to the jaw.

5 Claims, 3 Drawing Figures

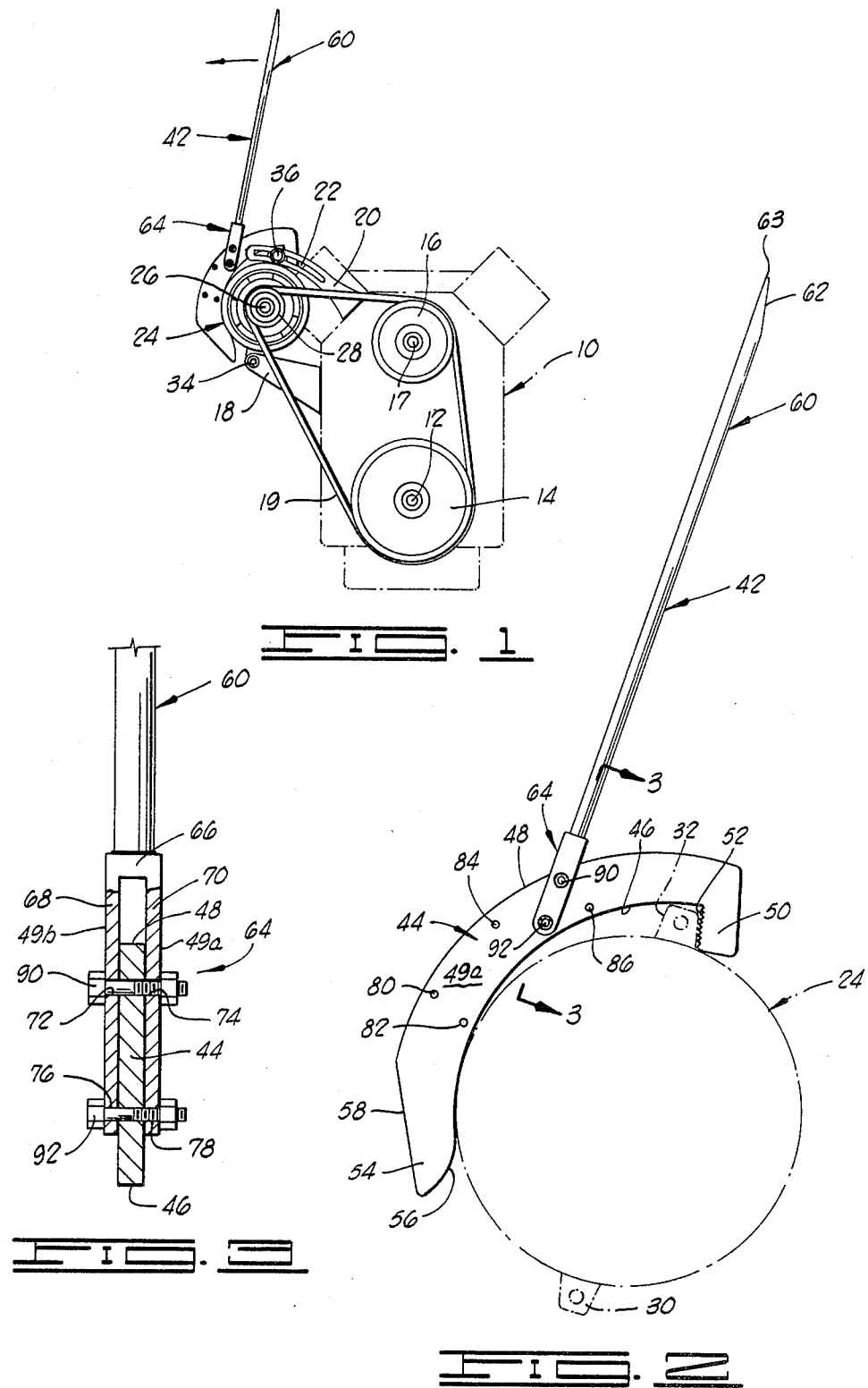

BELT TIGHTENING TOOL

BACKGROUND OF THE INVENTION

1. Field of the Invention

This invention relates to leverage hand tools, and more particularly to tools useful for tightening flexible endless drive belts operatively located in a restricted space, such as automobile air compressor and generator drive belts and fan belts.

2. Brief Description of the Prior Art

A multitude of hand tools have been developed for gripping an object and applying leverage so as to transmit a torque or apply a bending moment for some specialized purpose. Such tools include everything from pliers to crow-bars of wrecking bars, and the particular configuration of the object to be gripped, the leverage requirements, and the space available for attaching the tool to the object and for applying the leverage are all considerations in the development and design of such tools.

For example, Himes U.S. Pat. No. 1,151,013 depicts a type of leverage tool used for stretching and tightening wire fences. The Himes stretching tool used for tightening wire fences includes a jaw which is mounted at the end of a lever, with the lever defining or including a plurality of holes which enable certain wire-engaging hooks to be mounted on the jaw at different points therealong.

U.S. Pat. No. 1,493,389 to Rosenfield describes a jar wrench adapted for the removal of lids from jars. The jar wrench includes a fixed jaw and a second jaw which is adjustable in its position by means of a handle, so as to adjust the gripping characteristics and the leverage applied.

3. Brief Description of the Present Invention

The present invention is a specialized hand tool useful for tightening endless drive belts which drive one or more powered devices, with the drive belt being located in a restricted space. The tool is especially well adapted for engaging a generator or other apparatus of the sort driven by a flexible drive belt used in an automobile, which belt is frequently used for simultaneously driving two or more of the fan, the air conditioning compressor and the water pump, with power being delivered via the belt from a pulley keyed to a power output shaft from the engine.

Broadly described, the belt tightening tool of the invention comprises a jaw element which has an elongated lever arm adjustably connected thereto between the ends of the jaw element. The jaw element includes a concave gripping face or mouth which terminates at one of its ends in a projecting lug-engaging toe or gripping element which, in a preferred embodiment, is provided with serrated teeth. The concave gripping face of the jaw is configured to accommodate the circular external peripheral surface of a generally cylindrical housing or body of a generator, water pump, or the like to enable the belt tightening tool to be effectively engaged with such body or housing so that leverage can be applied to the body by use of the lever arm. The lever arm is preferably connected to the jaw element through a bifurcated bracket carried at one end of the lever arm. Adjustment of the position of connection of the lever arm to the jaw element is attained by means of a series of holes and a pair of bolts which, when extended through selected registering holes, effectively adjusts the angle at which the lever arm extends to the jaw.

An important object of the present invention is to provide a useful tool which can be easily and effectively employed for tightening endless drive belts which are extended around sheaves or pulleys carried on the shafts of a plurality of driving and driven elements.

A further object of the invention is to provide a belt tightening tool which is specifically useful in tightening drive belts of the sort used in association with automobile internal combustion engines for driving the compressor of the air conditioning system, the generator, the water pump, the fan and other ancillary equipment which is customarily provided in conjunction with the engine.

A further object of the invention is to provide a belt tightening tool which can be used for manually tightening a drive belt used for driving an automobile generator without the requirement for the user of the tool to assume an awkward or uncomfortable position while effecting the tightening of the belt.

A further object is to provide a belt tightening tool which is simple in its construction and mechanically rugged and durable so as to have a long and trouble-free service life.

Additional objects and advantages of the invention will become apparent as the following description of a preferred embodiment of the invention is read in conjunction with the accompanying drawings which illustrate such preferred embodiment.

GENERAL DESCRIPTION OF THE DRAWINGS

FIG. 1 is a front elevation view illustrating the belt tightening tool of the present invention as it has been placed in a position of engagement with the generator used in conjunction with an automobile internal combustion engine, and showing the manner in which the tool is used for tightening a flexible drive belt used for driving the generator from an output shaft of the internal combustion engine.

FIG. 2 is an enlarged side elevation view of the belt tightening tool of the invention, and illustrating a generator housing in dashed lines.

FIG. 3 is a sectional view taken along line 3—3 of FIG. 2.

DETAILED DESCRIPTION OF THE PREFERRED EMBODIMENTS

Referring initially to FIG. 1 of the drawings, an automobile internal combustion engine 10 is shown in dashed lines and typifies one context of usage of the belt tightening tool of the present invention. In this instance, the engine is illustrated as including an output or drive shaft 12 which carries a drive pulley 14. A fan blade pulley 16 is rotatably mounted upon a shaft 17 and is driven from the drive pulley 14 by an endless flexible drive belt 19.

Mounted on one side of the engine is an outwardly projecting anchor bracket 18. An adjusting bracket 20 having an elongated arcuate slot 22 therein is secured to the upper side of the engine at a location spaced above the bracket 18. The brackets 18 and 20 are used to provide support for a generator 24 which has an output shaft 26 which carries a belt-driven pulley 28 keyed thereto. The generator 24, in the illustrated form, carries a pair of lugs 30 and 32, shown in dashed lines in FIG. 2, on opposite sides of the generator body and these lugs function as points of securement of the generator 24 to the brackets 18 and 22 by the use of suitable bolts. It will be noted that a bolt 34, utilized in conjunction with the lower anchor bracket 18, provides a fixed point of pivotal support of the generator 24, whereas the bolt 36 used in conjunction with the slotted adjusting bracket 20 is slidable in the slot 22 when the bolt is loosened, so that the position of the generator in relation to the engine 10 can be varied and adjusted.

It should be pointed out that the particular form of generator 24 which is illustrated, and the manner in which it is mounted on the side of the engine 10, will vary from one automobile to another. In general, however, all mounting arrangements contemplate that the generator can be pivoted in such a way that the output shaft 26 and pulley 28 are varied in their spatial relationship to the drive pulley 14 and fan blade pulley 16. This adjustability allows the endless flexible drive belt to be tensioned or relaxed to prevent slippage, or to prevent the tension from being of sufficient magnitude to cause destructive wear on the bearings through which the several shafts 12, 16 and 26 extend.

It has previously been awkward and difficult to adjust the tension in a endless flexible drive belt of the sort typified by the drive belt 19 in the drawings because such belts are located in restricted or confined zones under the hood of the automobile, and with respect to the machinery there located. It has been necessary, generally, to attempt the tightening of the belt using two tools concurrently, and in such a way that muscle fatigue to the mechanic has resulted quickly, and tensioning has been a difficult and trying task.

The belt tightening tool of the present invention which greatly facilitates the tensioning of the drive belt in this context is illustrated in the drawings and is generally denominated by reference numeral 42. The belt tightening tool 42 is best illustrated in FIGS. 2 and 3, and includes an elongated, generally arcuate jaw element 44 which has a concave inner face 46 and a convex outer face 48. The inner face 46 will be hereinafter referred to as the gripping face of the jaw element 44. The arcuate jaw element 44 further includes a pair of opposed, substantially parallel, flat side surfaces 49a and 49b which extend between the inner and outer faces 46 and 48.

At one of its ends, the jaw element carries a lug-engaging toe or gripping element 50 which projects substantially normal to a tangent drawn to the convex outer face 48 and also substantially normal to a tangent drawn to the concave inner face 46 which extends roughly concentrically in relation to the outer face 48. The lug-engaging toe 50 is substantially rectangular in configuration, and carries, on a side edge which is nearest the concave gripping face 46, a plurality of serrations or teeth 52. At the opposite end of the arcuate jaw 44, the jaw tapers to a pointed end portion 54 which is bounded on one side by a reverse curved surface 56 which is convex in character and turns outwardly from the concave gripping face 46. The reverse curved surface 56 intersects a straight outer edge portion 58 so that the transverse dimension of the jaw element 44 adjacent this end thereof diminishes as the tip or end of the jaw element is approached.

An elongated lever arm, denominated generally by reference numeral 60, forms a second major portion of the belt tightening tool 42 of the invention. The lever arm 60 tapers at one of its ends to a tapered point 62 terminating in an edge 63, and is secured at its other end to a bifurcated connecting bracket 64. The connecting bracket includes, as shown in FIG. 3, a transverse web portion 66 which interconnects a pair of substantially parallel legs 68 and 70. The legs 68 and 70 are spaced from each other by a distance adequate to permit them to pass over the jaw element 44 in the manner shown in FIG. 3.

The legs 68 and 70 carry pairs of aligned bolt apertures. Thus, an aperture 72 formed in the leg 68 is aligned with an aperture 74 formed in the leg 70, and an aperture 76 is aligned with an aperture 78 formed in the leg 70. It will be noted in referring to FIG. 2 that a plurality of holes or apertures 80, 82, 84 and 86 are formed through the jaw 44 at spaced locations therealong and are arranged so that the connecting bracket 64 can be bolted to the jaw element 44 in various positions by means of a pair of nut and bolt subassemblies 90 and 92. In this way, the lever arm 60 can be projected at various selected angles from the jaw 44, and thus the belt tightening tool 42 can be changed in its configuration to permit it to be used to reach the various belt-driven devices used in conjunction with the internal combustion engine 10, and particularly, the belt-driven generators which are provided at various locations under the hood in various makes and models of automobiles.

In the use of the belt tightening tool 42 of the invention, a particular belt-driven device, such as the generator 24, a water pump or an air conditioning compressor, is loosened at one point of connection so as to permit it to be pivoted in a direction which will move the shaft and pulley thereof to a location where the flexible drive belt 19 is placed in greater tension, or is relaxed as may be necessary or desirable. In the case of the illustrated generator 24, the first operation toward the tightening of the belt consists in the loosening of the bolt 36 so as to permit the generator 24 to be pivoted about the bolt 34 and, in undergoing such pivotation, to move the bolt 36 along the slot 22 provided in the bracket 20. For tensioning the belt 40, the generator 24 is pivoted in a counterclockwise direction as it is viewed in FIGS. 1 and 2.

After the bolt 36 has been loosened in the described fashion, the belt tightening tool 42 of the present invention is placed in the position depicted in the drawings. Thus, the lug-engaging toe or gripping element 50 is placed over that portion of the lug 32 carried on the generator housing which lies behind the bracket 20 and which functions to receive the shank of the bolt 36. The arcuate jaw element 44 is then extended around the housing or body of the generator 24 until the concave inner or gripping face 46 comes into contact with the generally cylindrical generator housing at a location spaced well around the housing from the lug 32. Preferably, the point of contact of the arcuate jaw 44 with the generator housing is spaced at least 90° around the housing from the lug 32. Prior to the engagement of the tool 42 with the generator, the lever arm 60 has been secured to the arcuate jaw 44 so as to extend at the illustrated angle, and thereby permit force to be applied to the other end of the lever arm in the direction of the arrow shown near the top of the lever arm in FIG. 1. As torque is applied to the lever arm 42 in this fashion, the generator 24 is caused to pivot about the bolt 34 and, in undergoing such pivotation, to tension the belt 19.

The construction of the belt tightening tool 42 permits the tensioning of the belt to be accomplished very easily with a minimum amount of manual force applied at the outer end of the lever arm 60. After the belt 19 has been adequately tensioned in this fashion, the mechanic can easily retighten the bolt 36 to hold the generator in the position to which it has been pivoted, and it will be noted that the position of the lever arm 60 is such that full and clear access can be had to the head of the bolt 36 to accomplish the required tightening at this time.

With other types of automobiles, the generator may be located differently in relation to the engine 10, and it may be desirable to adjust the angle which is defined between the lever arm 60 and the arcuate jaw element 44. This can be quickly and easily accomplished by removing the nut and bolt subassemblies 90 and 92, and realigning or registering the holes formed through the legs 68 and 70 with a selected pair of holes or apertures formed through the arcuate jaw element 44 and then replacing the nut and bolt subassemblies.

It should be pointed out that in some instances, the particular location of one of the belt-drive auxiliary devices associated with the engine, coupled with the configuration of the housing in which it is located, may be such that it is difficult to effectively attach the arcuate jaw element 44. In such cases, it is often possible to use the tapered end 62 of the lever arm 60 to develop a prying action by which the auxiliary device, when loosened from its stationary mounting, can be pried to a position in which the belt is adequately tensioned.

From the foregoing description of a preferred embodiment of the invention, it will be perceived that the belt tightening tool of the invention is simple in its construction, and yet is ruggedly built and has no moving parts to malfunction during its utilization. Although a preferred embodiment of the invention has been herein described in order to illustrate the operating principles of the invention, it will be understood that various changes and modifications in the illustrated embodiment can be effected without departure from the basic principles which underlie the invention. Changes and innovations of this type are therefore deemed to be circumscribed by the spirit and scope of the invention, except as the same may be necessarily limited by the appended claims or reasonable equivalents thereof.

What is claimed is:

1. A belt tightening tool comprising:
   an elongated arcuate jaw element having a concave inner gripping face, a convex outer face and a pair of opposed, substantially parallel, flat side surfaces extending between said inner and outer faces;
   a lug-engaging to projecting from said jaw element at one end thereof; and
   elongated lever arm means having one end detachably and adjustably connected to said jaw element at a location intermediate the ends thereof, said elongated lever arm means comprising:
   an elongated lever arm; and
   a bifurcated connecting bracket which includes:
   a web portion secured to one end of said lever arm; and
   a pair of legs extending on opposite sides of said jaw element and adjustably connected to said jaw element;
   and further characterized in that said arcuate jaw element defines a plurality of pairs of spaced apertures extending therethrough from one of said side surfaces to the other; and
   each leg of said bifurcated connecting bracket defines a pair of spaced apertures, with the pairs of apertures in said legs aligned with each other, and the spacing of said apertures in said legs conforming to the spacing of said pairs of spaced apertures in said arcuate jaw element; and
   wherein said tightening tool further includes fastening means extending through aligned pairs of apertures in said legs and in said arcuate jaw element to secure said lever arm means to said arcuate jaw element at a selected angular relationship to said jaw element.

2. A belt tightening tool as defined in claim 1 wherein said toe is of substantially rectangular configuration and extends from said jaw element generally toward the center of curvature of said concave face from a location on said jaw element at one end of said concave face, said toe having a serrated side edge extending to, and intersecting, said concave face.

3. A belt tightening tool as defined in claim 2 wherein said concave face extends from said toe through an arc of at least about 90°.

4. A belt tightening tool comprising:
   an elongated arcuate jaw element having a concave inner gripping face, a convex outer face and a pair of opposed, substantially parallel, flat side surfaces extending between said inner and outer faces;
   a lug-engaging toe projecting from said jaw element at one end thereof;
   an elongated lever arm having a tapered end portion at one end thereof;
   a bifurcated connecting bracket which includes:
   a web portion secured to the end of said lever arm opposite said tapered end thereof; and
   a pair of legs extending on opposite sides of said jaw element and rigidly connected to said web portion; and
   means adjustably connecting said legs of said bifurcated connecting bracket to said jaw element for adjustably and selectively rigidly securing said lever arm to said jaw element at a selected angle with respect to said jaw element.

5. A belt tightening tool comprising:
   an elongated arcuate jaw element having a concave inner gripping face, a convex outer face and a pair of opposed, substantially parallel, flat side surfaces extending between said inner and outer face facilitating the placement of said jaw element in a narrow space measured in a direction normal to said parallel flat side surfaces, said jaw element having a plurality of apertures extending therethrough between said side surfaces;
   a lug-engaging toe projecting from said jaw element at one end thereof;
   an elongated lever arm; and
   a bifurcated connecting bracket connecting said lever arm to said apertured arcuate jaw element and including:
   a web portion secured to one end of said lever arm; and
   a pair of apertured legs extending on opposite sides of said jaw element; and
   means extending through selected apertures in said legs and said jaw element for adjustably connecting said jaw element to said lever arm at a selected angle of extension of said lever arm from said jaw element.

* * * * *